United States Patent
Moeller et al.

(10) Patent No.: US 8,015,178 B2
(45) Date of Patent: Sep. 6, 2011

(54) SYSTEM AND METHOD TO DETERMINE A SINGLE SQL BOM SOLVE

(75) Inventors: Thomas F. Moeller, Weilerswist (DE); Nigel Booth, Plymouth, MI (US); Gregory Leland Coleman, Lehi, UT (US)

(73) Assignee: Siemens Product Lifecycle Management Software Inc., Plano, TX (US)

( * ) Notice: Subject to any disclaimer, the term of this patent is extended or adjusted under 35 U.S.C. 154(b) by 137 days.

(21) Appl. No.: 11/482,534

(22) Filed: Jul. 7, 2006

(65) Prior Publication Data
US 2008/0010328 A1    Jan. 10, 2008

(51) Int. Cl.
*G06F 7/14* (2006.01)
*G06F 17/11* (2006.01)

(52) U.S. Cl. .................. 707/715; 707/765; 707/811

(58) Field of Classification Search .......... 707/100, 707/2, 4, 5, 3, 1, 999.001, 999.002, 999.003, 707/999.004, 999.1, 713, 715, 104.1, 999.005, 707/999.107, 765, 811; 708/200; 700/107; 705/29
See application file for complete search history.

(56) References Cited

U.S. PATENT DOCUMENTS

| | | | |
|---|---|---|---|
| 6,381,616 B1 | 4/2002 | Larson et al. | |
| 6,625,616 B1 * | 9/2003 | Dragon et al. | 707/802 |
| 2002/0143754 A1 * | 10/2002 | Paulley et al. | 707/3 |
| 2004/0044662 A1 | 3/2004 | Ganesan et al. | |
| 2006/0052896 A1 * | 3/2006 | Woehler | 700/107 |
| 2007/0005612 A1 * | 1/2007 | Goh et al. | 707/100 |
| 2007/0276808 A1 * | 11/2007 | McGushion | 707/3 |

OTHER PUBLICATIONS

Vorwerk K et al: "On implicate discovery and query optimization"; Database Engineering and Applications Symposium, 2002, Proceedings. International Jul. 17-19, 2002.
Piscataway, NJ, USA, IEEE, Jul. 17, 2002, pp. 2-11, XP010600945; ISBN: 0-7695-1638-6; p. 2, right-hand column, last paragraph—p. 3, left-hand column paragraph 2; p. 5, left-hand column, paragraph 1—p. 7, left-hand column, paragraph 1.
Jarke M et al: "Query Optimization in Database Systems"; ACM Computing Surveys, New York, NY, US, vol. 16, No. 2, Jun. 1984, pp. 111-152, XP002229970 ISSn: 0360-00300; p. 121, left-hand column, paragraph 1—p. 124, right-hand column, paragraph 1; tables 1-3.

* cited by examiner

*Primary Examiner* — James Trujillo
*Assistant Examiner* — Bruce Moser
(74) *Attorney, Agent, or Firm* — Micahel J. Wallace, Jr.

(57) ABSTRACT

A system, method, and computer program for storing a plurality of usage conditions to a data set for retrieval by a single query statement, comprising the steps of converting a usage condition into a first normal form representation, minimizing said first normal form representation, transforming said minimized first normal form representation into a second normal form representation, and storing said second normal form representation in said data set. The method wherein the steps comprising said storing step are repeated until each said usage condition is stored in to said data set and appropriate means and computer-readable instructions.

15 Claims, 9 Drawing Sheets

SYSTEM AND METHOD TO DETERMINE A SINGLE SQL BOM SOLVE

TECHNICAL FIELD

This invention relates generally to bill of materials solutions. More specifically, the invention relates to a system and method of determining a single SQL solution for a product bill of material.

BACKGROUND

The computer has greatly affected essentially all forms of information management, including the process of managing the entire lifecycle of a product from its conception, through design and manufacture to service and disposal. The term for this process is Product Lifecycle Management, or PLM. It is a cornerstone of a corporation's IT digital structure. One of the features of PLM is to collect knowledge that can be reused for other projects and to coordinate concurrent development of many products. PLM can also include the coordination of and management of product definition data, including configuring product variations. The management of product definition data involves managing that product's bill of materials. The bill of materials, or BOM, describes the product in a tabular format and in terms of its assemblies, sub-assemblies, and basic components and parts. The BOM is a subset of a larger bill of information concept which can enumerate information that is related to a product or a process and provide sufficient information as it is designed, manufactured, ordered, built, maintained, and/or processed.

As can be imagined, there is a lot of data required to maintain BOM's for multi-component products like an automobile or a jet fighter. To maintain data, a corporation's IT digital infrastructure utilizes a database system, or data warehouse, to manage all data flowing into and out from data centers. Typical database systems are distributed, relational, and/or object oriented, with relational being the most common. With each request to the relational database is at least one SQL statement, and more often than not there are tens to hundreds of SQL requests accessing information in the database. An example SQL query might retrieve the price of all hoses longer than 2 inches, sorted by manufacturer, with the following statement: SELECT price FROM hoses WHERE length>2 ORDER BY mfg. A common notation method in SQL techniques is to place the key words in capitalized letters and place the variables in lowercase letters. With potentially several thousand SQL statements requesting data from the relational database servers on one product configuration, there is a lot of computational stress placed on those servers.

Referring to product design and development, when a product is designed as a generic product family, it has to be configured to a specific product variant or product variant family for almost every business process throughout the entire product life cycle. Every manufactured product instance, every physical or digital prototype, every analysis or simulation, is based on a specific product variant configuration. All of these business processes that involve a specific product variant depend on the ability to solve a BOM to a specific product variant.

When the actual range of product variants that are manufactured and sold throughout the product lifecycle is not know until after completing the design phase, it is highly desirable to validate as many aspects of every product variant as soon as possible during the design phase. For example, clearance and interference checking processes may iterate through a list of product configurations on a regular basis.

There is a need for a solution that can send only one SQL statement when configuring the product for a specific string regardless of the size and complexity of the product. A better solution will substantially increase the number of product variants being validated early in the design phase, which will reduce problems found later in the lifecycle and resulting in shorter design phases.

SUMMARY

To achieve the foregoing, and in accordance with the purpose of the presently preferred embodiment as broadly described herein, the present application provides a method comprising the step of: storing a plurality of usage conditions to a data set for retrieval by a single query statement, comprising the steps of: converting a usage condition into a first normal form representation, minimizing said first normal form representation, transforming said minimized first normal form representation into a second normal form representation, and storing said second normal form representation in said data set. The method wherein the steps comprising said storing step are repeated until each said usage condition is stored in to said data set.

An advantage of the presently preferred embodiment is to provide a method comprising the step of using a single query statement to retrieve a product configuration from a data set having a plurality of usage conditions, comprising the steps of: converting a usage condition into a first normal form representation, minimizing said first normal form representation, transforming said minimized first normal form representation into a second normal form representation, and storing said second normal form representation in said data set.

Another advantage of the presently preferred embodiment is to provide a method comprising the steps of storing a plurality of usage conditions to a data set, comprising the steps of: converting said usage condition into a first normal form representations, minimizing said first normal form representations, transforming said minimized first normal form representations into a second normal form representations, and storing said second normal form representations in said data set; and using a single query statement to retrieve a product configuration from said data set. The method, wherein the steps comprising said storing step are repeated until each said usage condition is stored in to said data set.

And another advantage of the presently preferred embodiment is to provide a computer-program product tangibly embodied in a machine readable medium to perform a method to determine a single query statement, comprising instructions for storing a plurality of usage conditions to a data set for retrieval by a single query statement, comprising: instructions for converting a usage condition into a first normal form representation, instructions for minimizing said first normal form representation, instructions for transforming said minimized first normal form representation into a second normal form representation, and instructions for storing said second normal form representation in said data set. The computer-program product, wherein the instructions comprising said storing are repeated until each said usage condition is stored in to said data set.

Yet another advantage of the presently preferred embodiment is to provide a computer-program product tangibly embodied in a machine readable medium to perform a method to determine a single query statement, comprising instructions for using a single query statement to retrieve a product configuration from a data set having a plurality of usage conditions, comprising: instructions for converting a usage condition into a first normal form representation, instructions for minimizing said first normal form representation, instructions for transforming said minimized first normal form representation into a second normal form representation, and instructions for storing said second normal form representation in said data set.

And yet another advantage of the presently preferred embodiment is to provide a computer-program product tangibly embodied in a machine readable medium to perform a method to determine a single query statement, comprising instructions for storing a plurality of usage conditions to a data set, comprising: instructions for converting said usage condition into a first normal form representations, instructions for minimizing said first normal form representations, instructions for transforming said minimized first normal form representations into a second normal form representations, and instructions for storing said second normal form representations in said data set; and instructions for using a single query statement to retrieve a product configuration from said data set. The computer-program product, wherein the instructions comprising said storing are repeated until each said usage condition is stored in to said data set.

Still another advantage of the presently preferred embodiment is to provide a data processing system having at least a processor and accessible memory to implement a method to determine a single query statement, comprising means for storing a plurality of usage conditions to a data set; and means for using a single query statement to retrieve a product configuration from said data set. The data processing system, wherein the means comprising said storing means are repeated until each said usage condition is stored in to said data set.

Other advantages of the presently preferred embodiment will be set forth in part in the description and in the drawings that follow, and, in part will be learned by practice of the invention.

The presently preferred embodiment will now be described with reference made to the following Figures that form a part hereof. It is understood that other embodiments may be utilized and changes may be made without departing from the scope of the present invention.

BRIEF DESCRIPTION OF THE DRAWINGS

A presently preferred embodiment will hereinafter be described in conjunction with the appended drawings, wherein like designations denote like elements, and.

DETAILED DESCRIPTION OF THE PREFERRED EMBODIMENT

Figure 1:
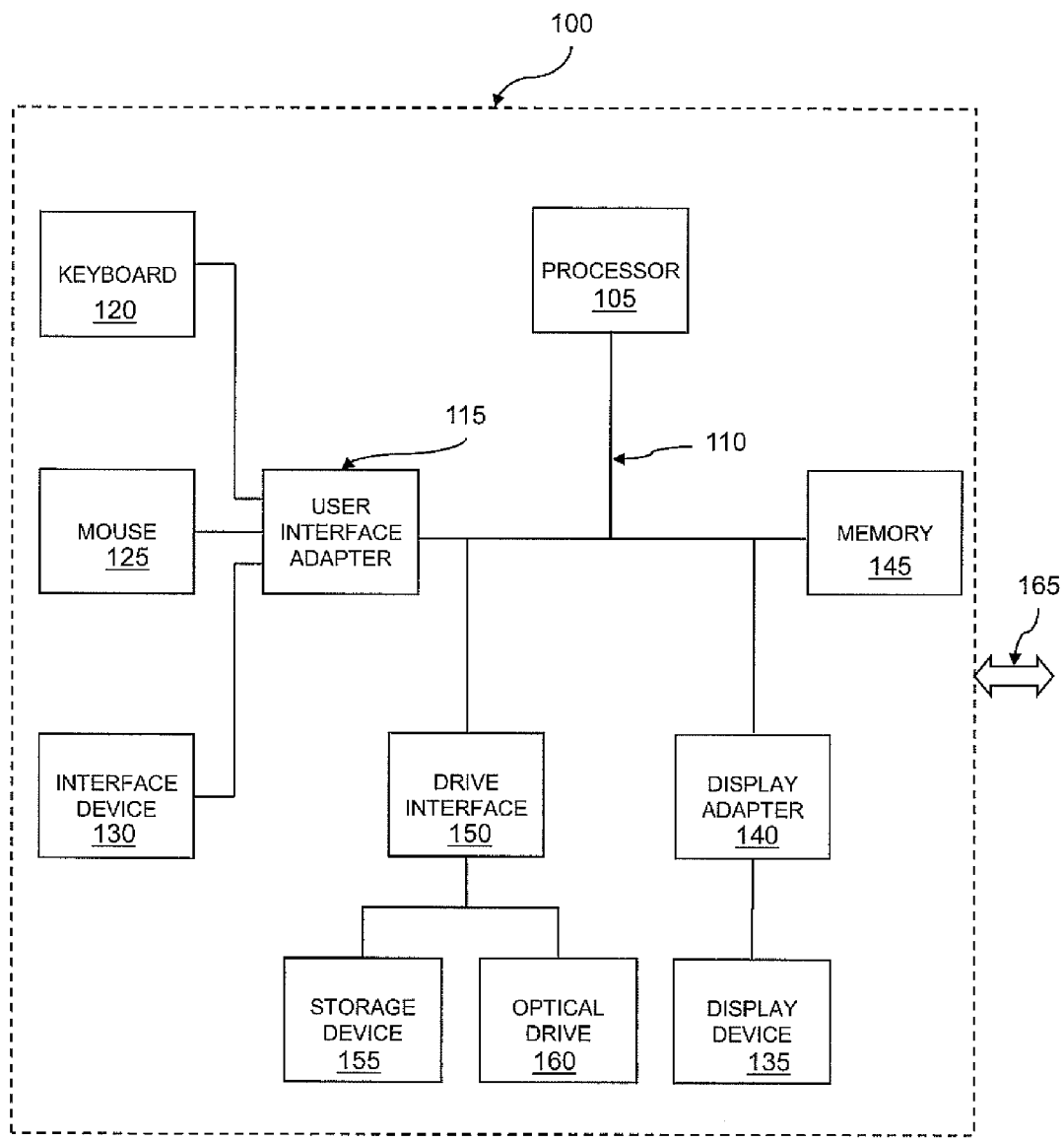
FIG. 1 is a block diagram of a computer environment in which the presently preferred embodiment may be practiced.

The numerous innovative teachings of the present application will be described with particular reference to the presently preferred embodiments. It should be understood, however, that this class of embodiments provides only a few examples of the many advantageous uses of the innovative teachings herein. The presently preferred embodiment provides, among other things, a system and method of determining a single SQL BOM solve. Now therefore, in accordance with the presently preferred embodiment, an operating system executes on a computer, such as a general-purpose personal computer. FIG. 1 and the following discussion are intended to provide a brief, general description of a suitable computing environment in which the presently preferred embodiment may be implemented. Although not required, the presently preferred embodiment will be described in the general context of computer-executable instructions, such as program modules, being executed by a personal computer. Generally program modules include routines, programs, objects, components, data structures, etc., that perform particular tasks or implementation particular abstract data types. The presently preferred embodiment may be performed in any of a variety of known computing environments.

With reference to FIG. 1, an exemplary system for implementing the presently preferred embodiment includes a general-purpose computing device in the form of a computer 100, such as a desktop or laptop computer, including a plurality of related peripheral devices (not depicted). The computer 100 includes a microprocessor 105 and a bus 110 employed to connect and enable communication between the microprocessor 105 and a plurality of components of the computer 100 in accordance with known techniques. The bus 110 may be any of several types of bus structures including a memory bus or memory controller, a peripheral bus, and a local bus using any of a variety of bus architectures. The computer 100 typically includes a user interface adapter 115, which connects the microprocessor 105 via the bus 110 to one or more interface devices, such as a keyboard 120, mouse 125, and/or other interface devices 130, which can be any user interface device, such as a touch sensitive screen, digitized pen entry pad, etc. The bus 110 also connects a display device 135, such as an LCD screen or monitor, to the microprocessor 105 via a display adapter 140. The bus 110 also connects the microprocessor 105 to a memory 145, which can include ROM, RAM, etc.

The computer 100 further includes a drive interface 150 that couples at least one storage device 155 and/or at least one optical drive 160 to the bus. The storage device 155 can include a hard disk drive, not shown, for reading and writing to a disk, a magnetic disk drive, not shown, for reading from or writing to a removable magnetic disk drive. Likewise the optical drive 160 can include an optical disk drive, not shown, for reading from or writing to a removable optical disk such as a CD ROM or other optical media. The aforementioned drives and associated computer-readable media provide non-volatile storage of computer readable instructions, data structures, program modules, and other data for the computer 100.

The computer 100 can communicate via a communications channel 165 with other computers or networks of computers. The computer 100 may be associated with such other computers in a local area network (LAN) or a wide area network (WAN), or it can be a client in a client/server arrangement with another computer, etc. Furthermore, the presently preferred embodiment may also be practiced in distributed computing environments where tasks are performed by remote processing devices that are linked through a communications network. In a distributed computing environment, program modules may be located in both local and remote memory storage devices. All of these configurations, as well as the appropriate communications hardware and software, are known in the art.

Software programming code that embodies the presently preferred embodiment is typically stored in the memory 145 of the computer 100. In the client/server arrangement, such software programming code may be stored with memory associated with a server. The software programming code may also be embodied on any of a variety of non-volatile data storage device, such as a hard-drive, a diskette or a CD-ROM. The code may be distributed on such media, or may be distributed to users from the memory of one computer system over a network of some type to other computer systems for use by users of such other systems. The techniques and methods for embodying software program code on physical media and/or distributing software code via networks are well known and will not be further discussed herein.

Figure 2:
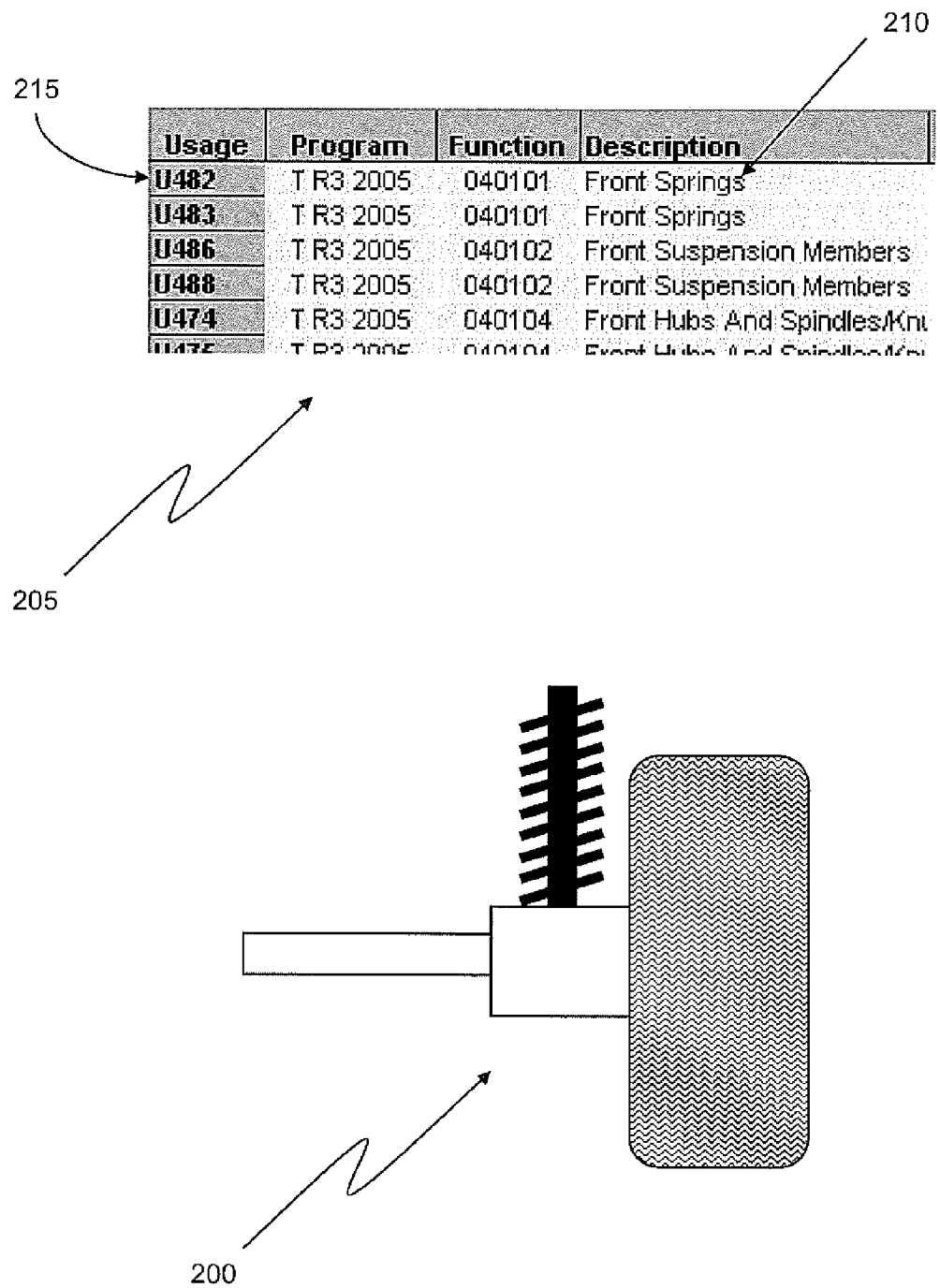
FIG. 2. is a partial bill of material with corresponding product.

Referring to FIG. 2, a partial bill of material with corresponding product. As shown in FIG. 2, a content and a structure of a product 200 is described in a bill of material (BOM) 205 that lists a series of components 210 comprising the product 200. Each element of the BOM 205 describes a unique usage of a specific quantity of the components 210 in what is called a line of usage (LOU) 215. A Boolean expression associated with the LOU 215 defines a variant condition under which the product 200 uses the component 210 with the quantity specified in the LOU 215, where the boolean expression combines one or more available product features or variant options. This boolean expression is called a usage condition.

Figure 3:
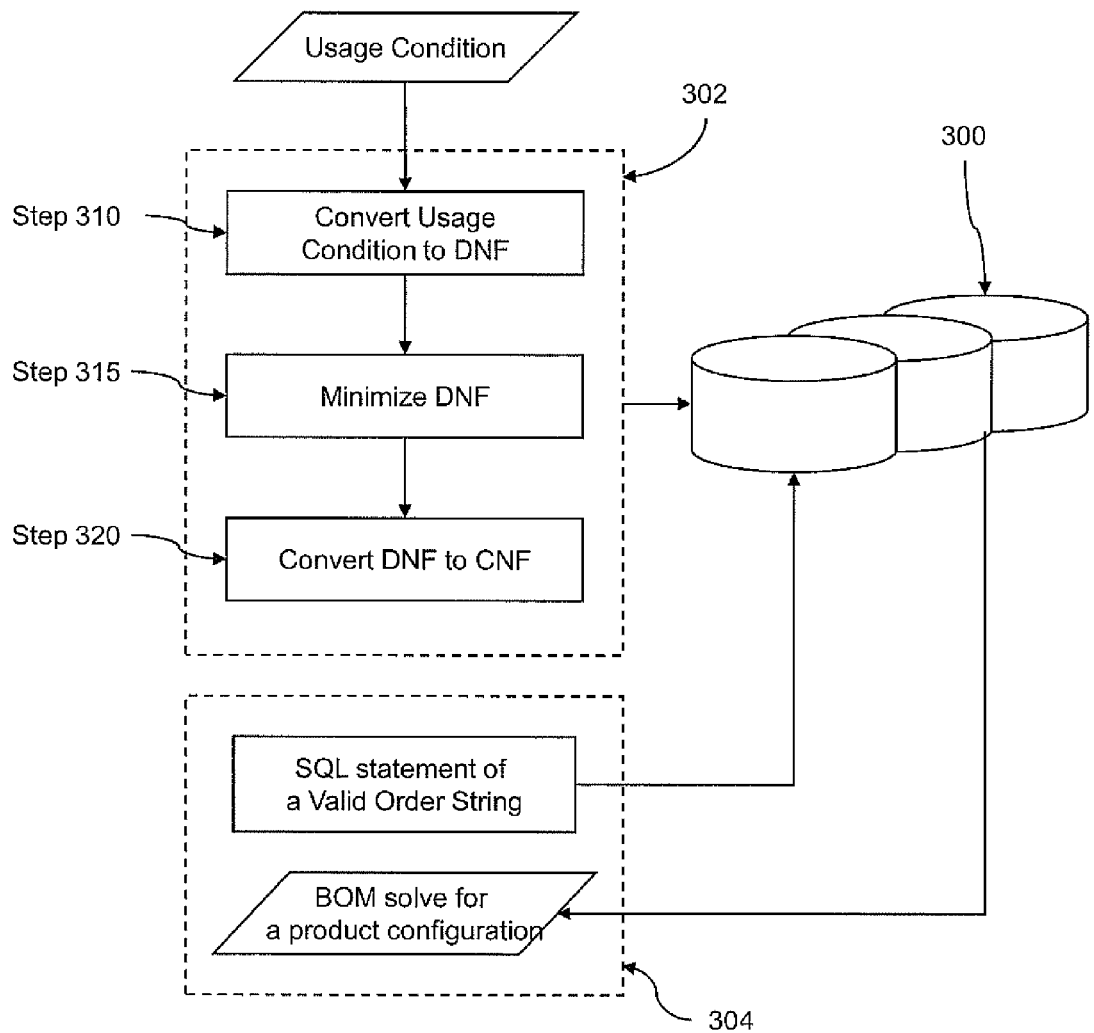
FIG. 3 is a dataflow diagram of the presently preferred embodiment.

Referring to FIG. 3, a dataflow diagram of the presently preferred embodiment. As shown in FIG. 3, the present application describes an innovative structure query language (SQL) call to a database 300 that enables a user to create a single SQL statement BOM solution in essentially two steps: first, at an expression save time 302 that is when every Boolean expression associated to the line of usage is stored in the database 300; and second, at a solve time 304 that is when the Boolean expressions that match a valid order string for a given feature set are selected with a single SQL statement.

At the expression save time 302, convert the usage condition into a conjunction normal form (CNF) before storing the CNF in the database 300. The process of converting the usage condition into the CNF involves the steps of converting the usage condition into a disjunctive normal form (Step 310), minimizing the disjunctive normal form (Step 315), and finally converting the disjunctive normal form into the conjunctive normal form (Step 320).

Figure 4:
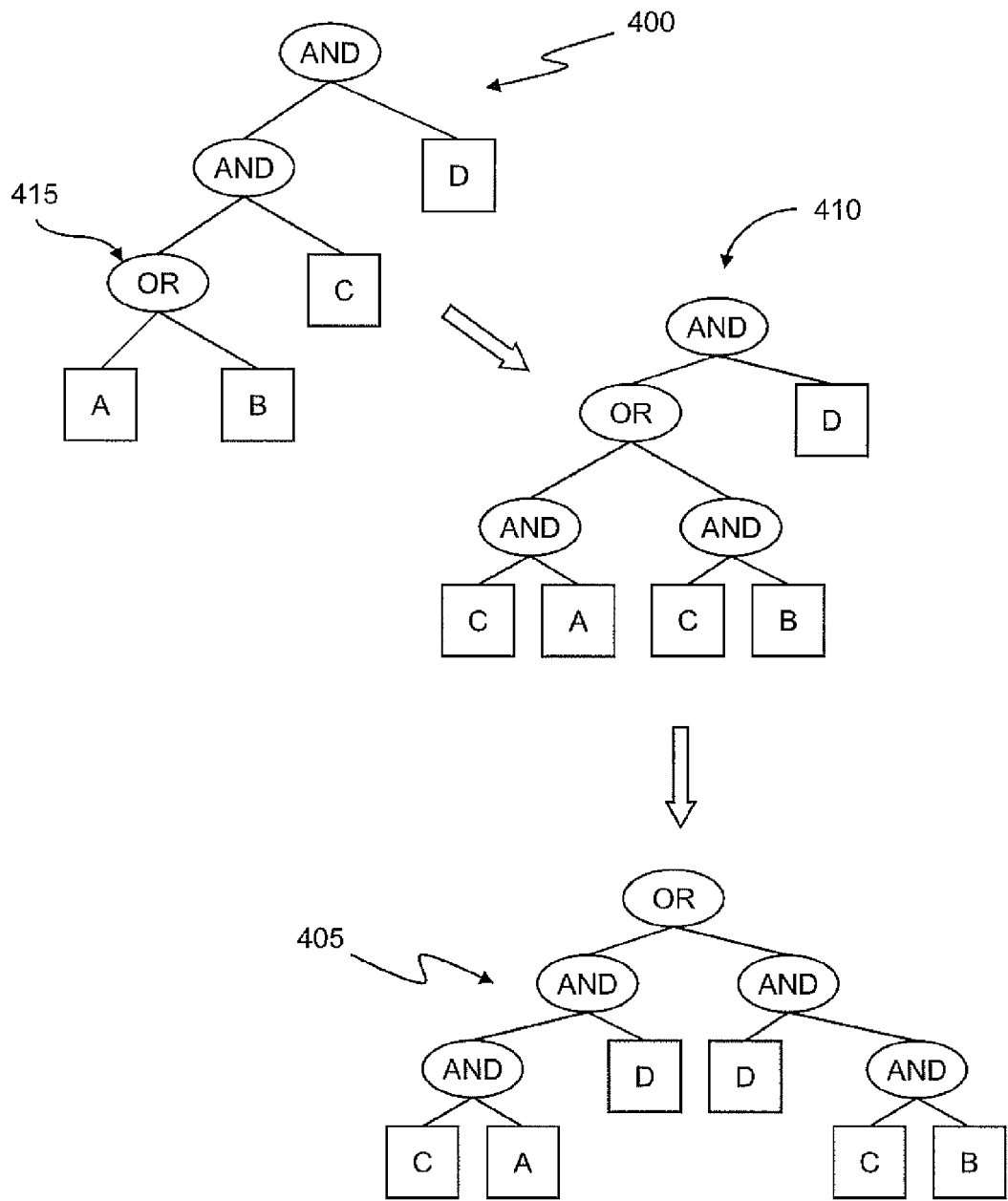
FIG. 4 illustrates a process of transforming a binary tree Boolean expression into a normal form.

Referring to FIG. 4, a process of transforming a binary tree Boolean expression into a normal form. As shown in FIG. 4, the usage condition, ((A OR B) AND C) AND D) shown as a binary tree 400, can be converted into the DNF 405 by moving AND-nodes 410 down and OR-nodes 415 up. The usage condition is expressed in Disjunctive Normal Form (DNF), if it consists of a disjunction of conjunctions where no conjunction contains a disjunction, e.g., (a AND b) OR (b AND c) in pedantic notation. In Polish Notation, the DNF has the following form: $OR(t_1, t_2, \ldots t_n)$, where all terms $t_1 \ldots t_n$ have the form $AND(l_1, l_2, \ldots, l_n)$. $L_1 \ldots l_n$ are literals each representing a single boolean variable, e.g., "color EQUAL green", or "NOT size EQUAL large."

The AND-nodes that need to be moved down can be found by searching the binary tree for any AND-nodes having an OR-node as a child. The search can be implemented as a recursive function beginning at the top. If the search processes a node before processing its child, and if matching AND-nodes are appended to the end of a result tree, the final result tree will list all AND-nodes to be moved down in reverse order in which they need to be processed. The aforementioned process of recursively traversing a binary tree is well-known to those skilled in the art and will not be addressed with further detail.

FIGS. 5a-5e illustrate a process to convert binary tree Boolean expression into a normal form, including converting a logical formula expression into its DNF equivalent, by application of De Morgan's Law and distribution laws in elementary logic (Step 310). It is important to note that DNF is generous with operators while very strict about nesting: a single level of disjunction and a single level of conjunction within each disjunct. Accordingly, upon reaching a single level of nesting 500 and converting the DNF to the CNF form by creating the negated expression, it quickly becomes apparent that the process may produce the CNF 505 with redundant or duplicate elements, like duplicate literals 510 or duplicate terms 515, for example. With these elements, it is important to simplify the DNF and the therefore the resulting CNF which it is based upon.

Figure 5A:
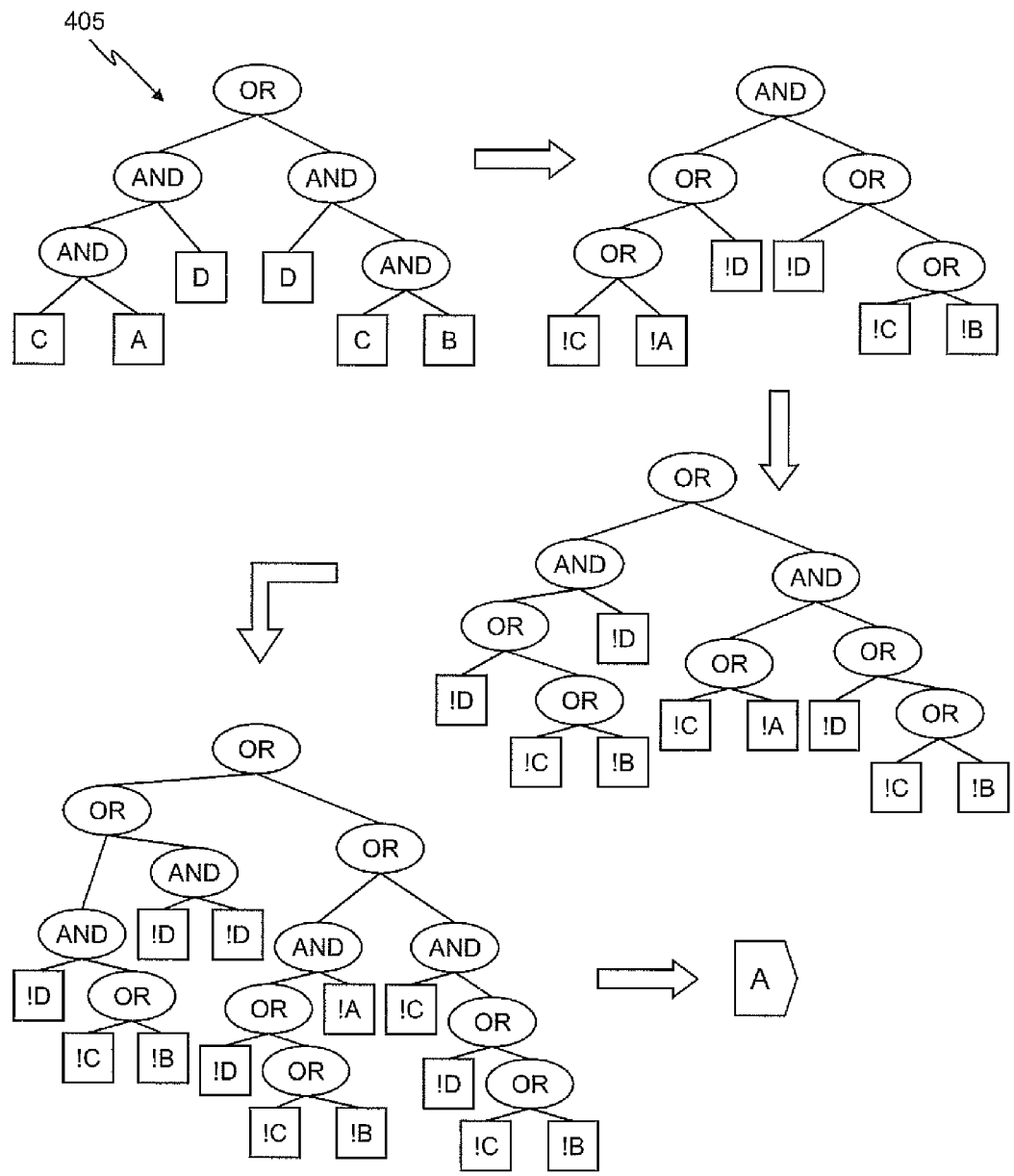
FIGS. 5*a*-5*e* illustrate a process to convert binary tree Boolean expression into a normal form.
Figure 5B:
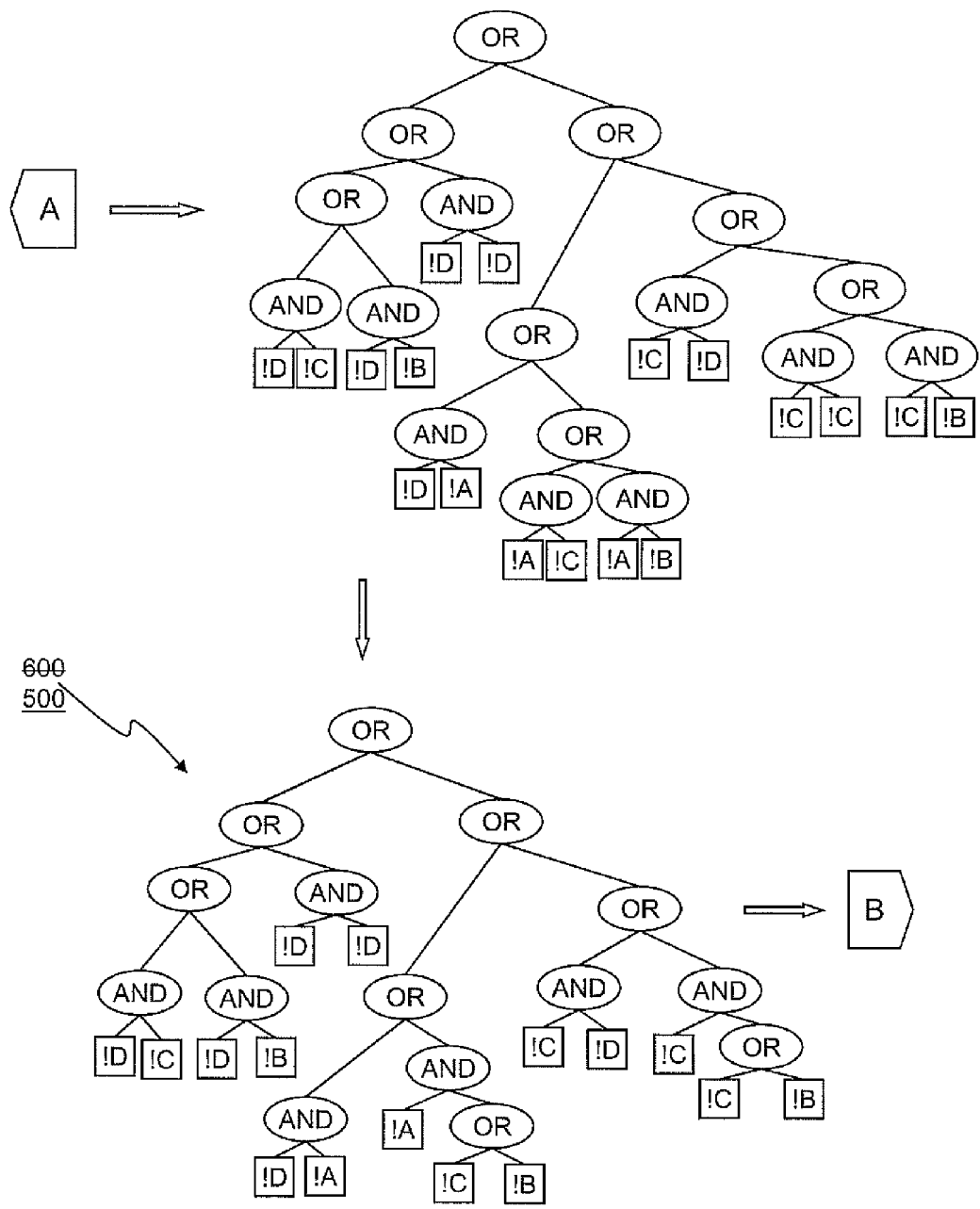
Figure 5C:
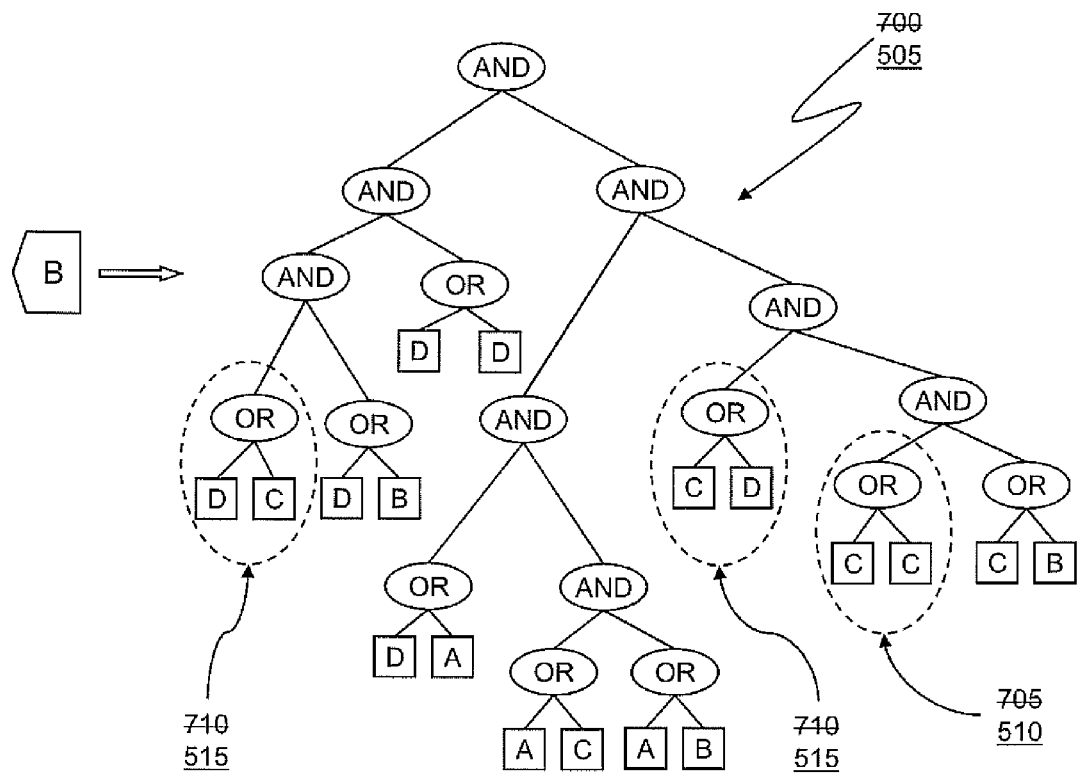
Figure 5D:
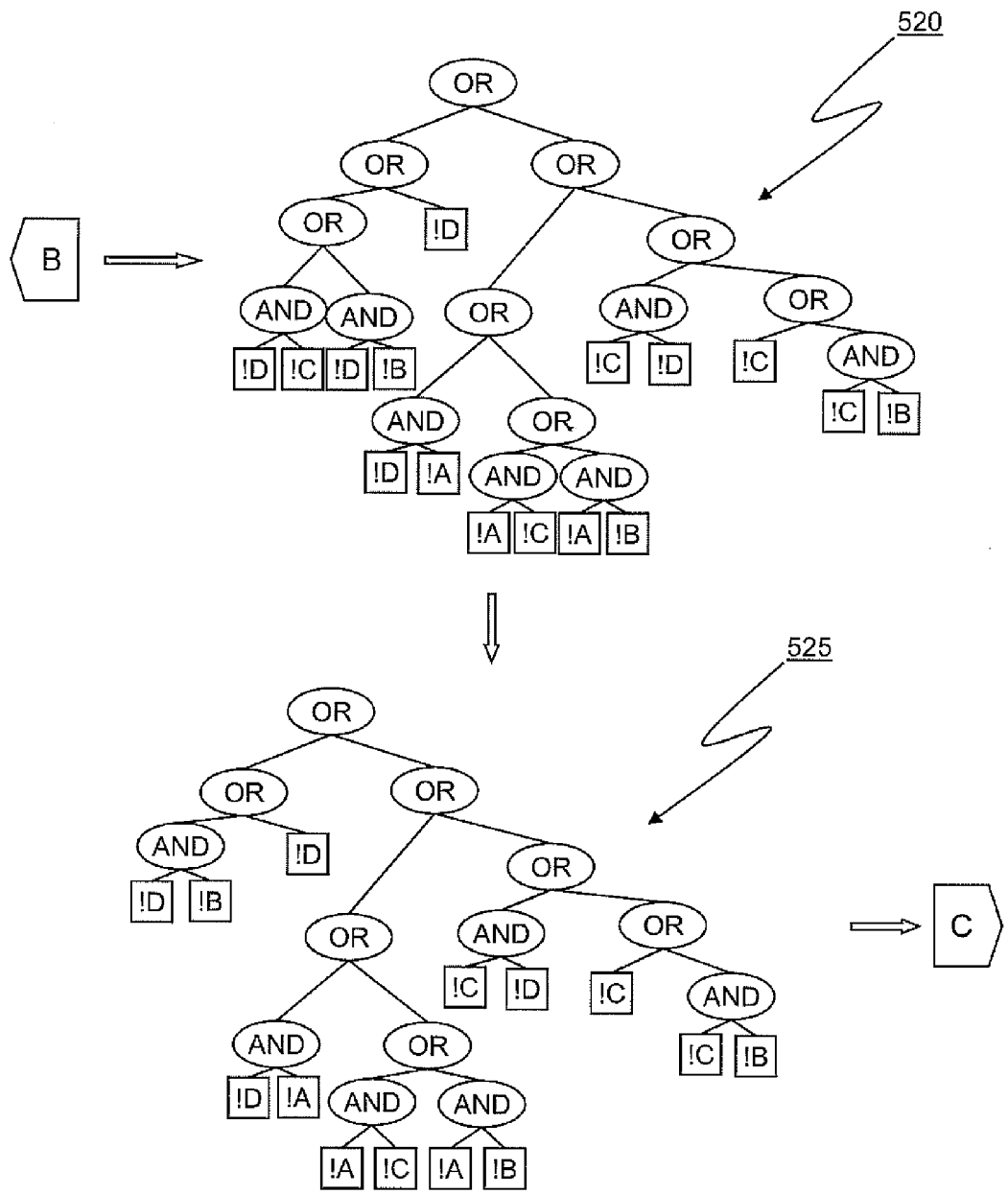
Figure 5E:
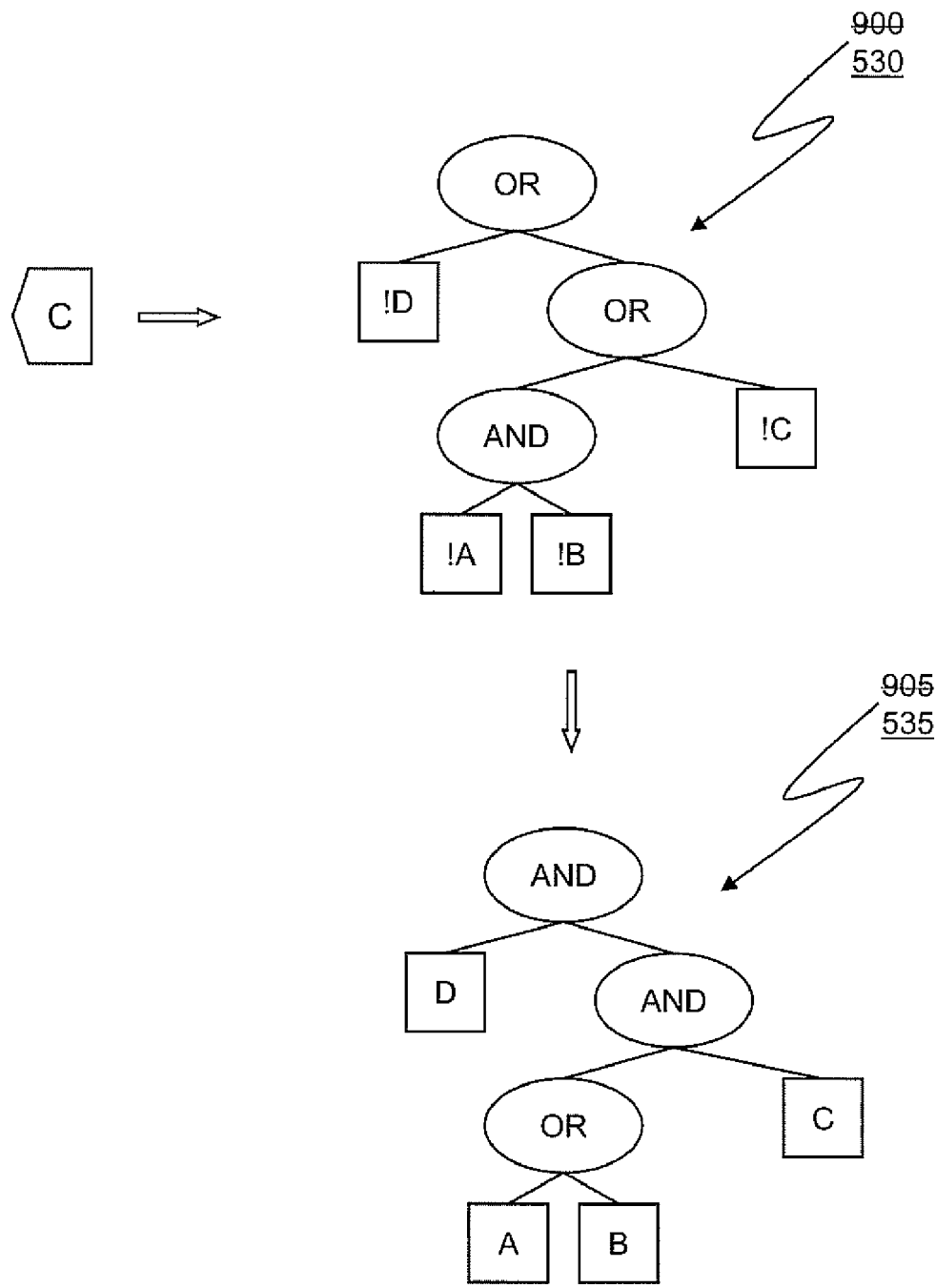

As shown in FIGS. 5d-5e, simplifying the DNF is important for increased performance (Step 315) returning to the single level of nesting 500, continue with eliminating any duplicate literals 510, generally illustrated at 520. Next, eliminate irrelevant terms, i.e., those terms that contain complementary (e.g., a AND !a) or otherwise unsatisfiable literals ("length GREATER 10 m AND length LESS 8 m"). After that, duplicate terms 510 are removed, generally illustrated at 525. Next, irrelevant literals are removed according to an implementation of the Theorem of Consensus, a well known technique to simplify Boolean logic, and also take into consideration a set of dependency rules. According to the implementation of the Theorem of Consensus, the presently preferred embodiment eliminates a term $t_i$ with literals $l_i$, if a term $t_j$ with literals $l_j$ exists where $l_i$ and $l_j$ are identical sets with the exception of a single literal $l_{ij}$ and $l_{jj}$ in each set where $l_{ii}$=NOT $l_{jj}$. It is important to test whether $l_{ii}$ OR $l_{jj}$==TRUE, which is always the case if $(l_{ii})$==NOT $(l_{jj})$. Alternatively, it is also TRUE in other cases like LENGTH>5 OR LENGTH<10, where the two literals are $l_{ii}$:=LENGTH>5 and $l_{jj}$:=LENGTH<10 that is equivalent to $(l_{ii})$ !=NOT $(l_{jj})$ while the following $l_{ii}$ OR $l_{jj}$==TRUE is valid. The two terms containing $l_{ii}$ and $l_{jj}$ can be simplified based on the Theorem of Consensus that provides more checks to simplify when starting with a full minterm table where it is sufficient to only check for an overlap of one single literal.

If such a term $t_i$ exists, it can be eliminated after the literal $l_{jj}$ is removed from term $t_j$. If eliminating a literal empties term the expression is always false. If at least one literal was removed from some term in this step, the simplification may repeat the prior step. Continuing, if for each literal $l_i$ in term $t_i$ another term $t_j$ exists that contains a literal $l_j$=NOT $l_i$, the expression is always false. Finally, eliminate term $t_i$ if its set of literals $l_i$ fully includes the set of literals $l_j$ of another term $t_j$ as generally illustrated at 530.

The usage condition in the simplified DNF form is converted into its corresponding CNF form of ((a OR b) AND c) AND d, generally illustrated at 535, for storage into the database 300. The simplified CNF represents the Boolean condition as a list of clauses $(c_1 \ldots c_n)$ combined through an AND operator, where each clause contains one or more option literals $(l_1 \ldots l_n)$ that are combined through an OR operator. The literals may come in one of two forms: "featurefamily EQUAL value" and "NOT featurefamily EQUAL value." Feature and featurefamily are used interchangeably for features that are not a member of any feature family, i.e., they are standalone features. Standalone features always have two values indicating whether the feature is selected or no, e.g., on/off, yes/no, present/absent, etc. Should the literal be an inequality literal, e.g., length LESS THAN 10 m, it persists as the list of enumerated feature literals that satisfy this expression, e.g., "OR(length EQUAL 8 m, length EQUAL 9.8 m, ..., length EQUAL 1 m)," and using the list of features that has been made available on the product via the product variability. Accordingly, usage conditions that contain inequality literals need to be expanded again into the applicable enumerated features if a new value is added to the product variability for one of the feature families of the usage conditions references.

Once the usage condition is simplified into its respective CNF (Step 320), each of the identified option literals is stored as a separate record in a database table along with a LOU identifier, a unique clause identifier (the i in $c_i$), an expected clause count (the n in $c_i \ldots c_n$), a feature index of the variant option for the stored option literal in a feature value table, and an exclude flag.

| table UsageConditionLiterals | |
| --- | --- |
| Field | Type |
| LineOfUsage | int |
| Expected | int |
| clause | int |
| feature | int |
| exclude | int |

If the variant option does not match an feature name in the feature value table, but matches a summary code, a summary code index value is stored as a negative number.

| table FeatureValue | |
| --- | --- |
| Field | Type |
| feature | int |
| family | int |
| code | varchar (4) |
| description | varchar(50) |

Put another way, the feature index is a foreign key into the feature value table, unless the value is negative, in which case its absolute value is a foreign key into a summary code table, where the summary table contains a list of summary codes and can be used to resolve a key into a subset of feature values in the feature value table.

| table SummaryCode | |
| --- | --- |
| Field | Type |
| code | int |
| feature | int |

The feature value table contains a record for each available feature, along with a name, a description, and a feature family ID.

In some cases usage conditions may be expressed using summary codes, which implement a level of indirection for referencing feature values. Summary codes can be used to express a generic usage condition referencing a list of features using a single pseudo option value, the "Summary Code." Therefore, the usage conditions are not impacted by changes to the list of features included in the Summary Code, e.g., a "CD stereo" is added to Summary Code "all stereo radios." It is sufficient to just change the definition of the Summary Code.

To summarize, at the expression save time 302, before the solve time 304 can occur, the order string that defines the product configuration needs to be stored. Order strings always explicitly list all features for which the product should be configured with the following form: AND $(l_1, l_2, \ldots, l_n)$, where $l_1 \ldots l_n$ are literals representing a single feature that can be expressed through a boolean variable using the EQUAL operator, e.g., color EQUAL green, size EQUAL large, etc. The order string is stored with one line for each literal in the order string in a solve table that may be implemented as a temporary table while it is not necessary to persist the order string longer than it takes to do the BOM solve.

Each literal in the conjunctive normal form is stored as a separate line in the database according to the schema above. The solve time 304 copies literals referencing summary codes into its set of corresponding feature literals with an outside join against the summary code table. The resulting list of records is then reduced by doing an outside join against the features in a solve table, including only those records that match a feature in the solve table unless the record contains the "exclude" flag in which case the record is only included if it does not match any feature in the solve table for the specific BOM solve in progress.

| table Solve | |
| --- | --- |
| Field | Type |
| solve | int |
| feature | int |

The records in the resulting list are then grouped by their line of usage, and if the distinct count of clauses equals the expected count for that line of usage, the line of usage is included in the BOM solve. This returns a list of all of the lines of usages pertaining to the product variant when configured for this order string. A sample SQL statement to accomplish the BOM solve is: SELECT LineOfUsage FROM UsageConditionLiterals LEFT OUTER JOIN SummaryCodes ON UsageConditionLiterals.feature=SummaryCodes.code LEFT OUTER JOIN Solve on (SummaryCodes.feature= Solve.feature OR UsageConditionLiterals.feature=Solve. feature) WHERE Solve.solve=1 and ((UsageConditionLiterals.exclude=0 AND Solve.feature IS NOT NULL) OR (UsageConditionLiteral.exclude=1 AND Solve.feature IS NULL))GROUP BY LineOfUsage HAVING COUNT(distinct clause)=MAX(expected).

The presently preferred embodiment may be implemented in digital electronic circuitry, or in computer hardware, firmware, software, or in combinations thereof. An apparatus of the presently preferred embodiment may be implemented in a computer program product tangibly embodied in a machine-readable storage device for execution by a programmable processor; and method steps of the presently preferred embodiment may be performed by a programmable processor executing a program of instructions to perform functions of the presently preferred embodiment by operating on input data and generating output.

The presently preferred embodiment may advantageously be implemented in one or more computer programs that are executable on a programmable system including at least one programmable processor coupled to receive data and instructions from, and to transmit data and instructions to, a data storage system, at least one input device, and at least one output device. The application program may be implemented in a high-level procedural or object-oriented programming language, or in assembly or machine language if desired; and in any case, the language may be a compiled or interpreted language.

Generally, a processor will receive instructions and data from a read-only memory and/or a random access memory. Storage devices suitable for tangibly embodying computer program instructions and data include all forms of nonvolatile memory, including by way of example semiconductor memory devices, such as EPROM, EEPROM, and flash memory devices; magnetic disks such as internal hard disks and removable disks; magneto-optical disks; and CD-ROM disks. Any of the foregoing may be supplemented by, or incorporated in, specially-designed ASICs (application-specific integrated circuits).

A number of embodiments have been described. It will be understood that various modifications may be made without departing from the spirit and scope of the presently preferred embodiment. Therefore, other implementations are within the scope of the following claims.

What is claimed is:

1. A method for storing a plurality of usage conditions to a data set for retrieval by a single query statement, comprising the steps of:
    converting a usage condition into a normal form representation by a computer system, wherein the usage condition includes a Boolean expression corresponding to at least one product feature and that defines a variant condition under which a product uses a component;
    minimizing said normal form representation by the computer system;
    transforming said minimized normal form representation into a conjunctive normal form representation by the computer system;
    storing said conjunctive normal form representation in said data set by the computer system; and
    producing a bill of materials by retrieving a product configuration from the data set, the bill of materials including a line-of-usage indicator that describes a usage of a quantity of the component and that corresponds to the usage condition.

2. The method of claim 1, wherein the steps are repeated until each said usage condition is stored in to said data set.

3. The method of claim 1, wherein said usage condition is an order string for a product configuration.

4. A method for retrieving a product configuration comprising the steps of:
    converting a usage condition into a normal form representation by a computer system, wherein the usage condition includes a Boolean expression corresponding to at least one product variant option and that defines a variant condition under which a product uses a component;
    minimizing said normal form representation by the computer system;
    transforming said minimized normal form representation into a conjunctive normal form representation by the computer system;
    storing said conjunctive normal form representation and a line-of-usage indicator that describes a usage of a quantity of the component for a bill of materials corresponding to the product in said data set by the computer system; and
    retrieving a product configuration from the data set having a plurality of usage conditions using a single query statement to produce the bill of materials, the bill of materials including multiple components each having a line-of-usage indicator.

5. A method comprising the steps of:
    storing a plurality of usage conditions to a data set by a computer, wherein each usage condition includes a Boolean expression corresponding to at least one product feature and that defines a variant condition under which a product uses a component, comprising the steps of:
        converting said usage condition into a normal form representations by the computer, minimizing said normal form representations,
        transforming said minimized normal form representations into a conjunctive normal form representations by the computer, and
        storing said normal form representations and a line-of-usage indicator that describes a usage of a quantity of the component for a bill of materials corresponding to the product in said data set by the computer; and
    using a single query statement to retrieve a product configuration from said data set and to produce a bill of materials corresponding to the product configuration.

6. The method of claim 5, wherein the steps comprising said storing a plurality of usage conditions are repeated until each said usage condition is stored in to said data set.

7. The method of claim 5, wherein said usage condition is an order string for a product configuration.

8. A computer readable medium storing executable instructions that, when executed by a computer cause the computer to perform a method, comprising:
    instructions for storing a plurality of usage conditions to a data set for retrieval by a single query statement, wherein each usage condition includes a Boolean expression corresponding to at least one product feature and that defines a variant condition under which a product uses a component, comprising:
        instructions for converting a usage condition into a normal form representation;
        instructions for minimizing said normal form representation;
        instructions for transforming said minimized normal form representation into a conjunctive normal form representation and;
        instructions for storing said conjunctive normal form representation in said data set; and
    instructions for producing a bill of materials by retrieving a product configuration from the data set, the bill of materials including a line-of-usage indicator that describes a usage of a quantity of the component and that corresponds to the usage condition.

9. The computer readable medium of claim 8, wherein the instructions comprising said storing are repeated until each said usage condition is stored in to said data set.

10. The computer readable medium of claim 8, wherein said usage condition is an order string for a product configuration.

11. A computer readable medium storing executable instructions that, when executed by a computer, cause the computer to perform a method comprising the steps of:
    converting a usage condition into a normal form representation, wherein the usage condition includes a Boolean expression corresponding to at least one product feature and that defines a variant condition under which a product uses a component;
    minimizing said normal form representation;
    transforming said minimized normal form representation into a conjunctive normal form representation;
    storing said conjunctive normal form representation and a line-of-usage indicator that describes a usage of a quantity of the component for a bill of materials corresponding to the product in said data set; and retrieving a product configuration from the data set using a single query statement to produce the bill of materials, the bill of materials including multiple components each having a line-of-usage indicator.

12. A computer readable medium storing executable instructions that, when executed by a computer cause the computer to perform a method, comprising:

instructions for storing a plurality of usage conditions to a data set, wherein each usage condition includes a Boolean expression corresponding to at least one product variant option and that defines a variant condition under which a product uses a component, comprising:

instructions for converting said usage condition into a normal form representations, instructions for minimizing said normal form representations, instructions for transforming said minimized normal form representations into a conjunctive normal form representations, and instructions for storing said conjunctive normal form representations and a line-of-usage indicator that describes a usage of a quantity of the component for a bill of materials corresponding to the product in said data set; and instructions for using a single query statement to retrieve a product configuration from said data set to produce the bill of materials corresponding to the product configuration.

13. The computer readable medium of claim 12, wherein the instructions comprising said storing are repeated until each said usage condition is stored in to said data set.

14. The computer readable medium of claim 12, wherein said usage condition is an order string for a product configuration.

15. A data processing system comprising a processor and accessible memory and configured to implement a method to determine a single query statement by performing the steps of:

storing a plurality of usage conditions reduced to a conjunctive normal form to a data set, wherein each usage condition includes a Boolean expression corresponding to at least one product feature and that defines a variant condition under which a product uses a component, and storing a line-of-usage indicator that describes a usage of a quantity of the component for a bill of materials corresponding to the product in the data set; and retrieving a product configuration from said data set using a single query statement and creating the bill of materials corresponding to the product configuration.

* * * * *